UNITED STATES PATENT OFFICE.

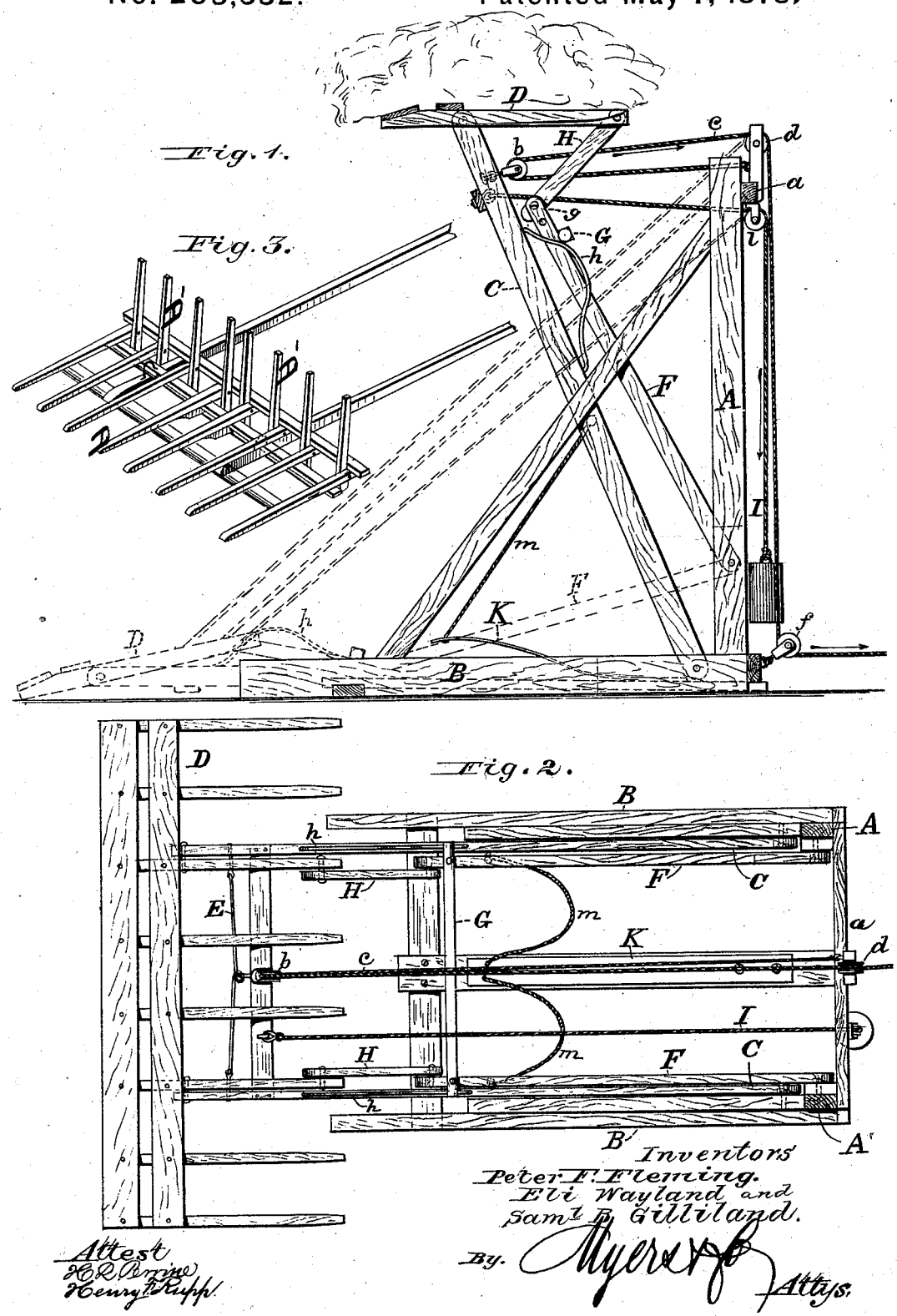

PETER F. FLEMING, ELI WAYLAND, AND SAMUEL B. GILLILAND, OF SALISBURY, SAID FLEMING ASSIGNOR TO A. W. TERRILL, OF MEXICO, MO.

IMPROVEMENT IN HAY LOADERS AND STACKERS.

Specification forming part of Letters Patent No. 203,332, dated May 7, 1878; application filed February 28, 1878.

*To all whom it may concern:*

Be it known that we, PETER F. FLEMING, ELI WAYLAND, and SAMUEL B. GILLILAND, of Salisbury, in the county of Chariton and State of Missouri, have invented certain new and useful Improvements in Hay Stackers and Loaders; and we do hereby declare that the following is a full, clear, and exact description thereof, which will enable others skilled in the art to which it appertains to make and use the same, reference being had to the accompanying drawings, and to letters of reference marked thereon, which form a part of this specification.

Our invention relates to apparatus for loading and stacking hay; and consists in certain improvements in the construction of the same, as hereinafter shown and described, our apparatus being constructed so that the hay is received from the hay-rake upon a long fork coupled to the ends of elevating-arms, and raised, by means of cords and pulleys, to a suitable height for depositing it on the load or stack. Means are also provided for holding the receiving-fork in proper position during its elevation, and for withdrawing and lowering it when the hay has been deposited.

In the drawing referred to as forming part of this specification, Figure 1 is a side view of our improved hay-loading apparatus. Fig. 2 is a plan view of the same. Fig. 3 is a perspective view of a modified form of the forks.

A designates two upright posts, with a cross-piece, $a$, at the front of the frame and B the base pieces, the elevating-arms C being hinged to the base near the posts A.

To the outer or rear ends of the arms C is hinged the fork D for receiving the hay from the hay-rake. E is a bail coupled to the arms C, to which bail is attached a pulley, $b$. Another pulley, $d$, is attached to the cross-piece $a$, and a cord, $c$, having one end fastened to said cross-piece is passed to and about the pulley $b$; from thence forward over the pulley $d$, and downward to and under a pulley, $f$, secured to or near the base below. By means of the cord $c$ and pulleys the elevating-arms holding the fork D are raised during operation, the cord being usually drawn by a horse or other draft animal.

The jointed arms F are hinged to the front part of the frame a few feet higher than the line where the arms C are connected, and are so placed as to partially sink within the arms C as the latter are raised. A cross-piece, G, is fastened to the arms F near the joints $g$, as shown, the ends of the piece G projecting somewhat, so as to impinge against or move on the guides $h$ fastened to the arms C.

The pieces H, forming a connection between the arms F and fork D, being coupled to teeth of the fork, as shown, serve to hold the loaded fork in position as it is raised. The relative position of the fork and connecting parts during the elevation is shown in Fig. 1.

Centrally within or on the base of the frame is secured a spring, K, connected by cords $m$ with the arms C, the said spring serving to withdraw the fork D after it has unloaded, so that the arms C and fork will descend from their own weight. A weighted rope, I, passing over a pulley, $l$, and connecting with arms C, is used to assist in starting the fork after it is loaded, and also to prevent its falling suddenly after the load has been deposited.

In Fig. 3 the fork is provided with additional pivoted tines or fingers D' D', to assist the stacking or loading of the hay.

The fork D, having the fingers or rack D', is especially adapted for use in windy weather.

We claim as our invention—

1. In combination with arms C, holding the fork D, and provided with guides $h$, the jointed arms F, coupled to the frame and provided with cross-piece G, and pieces H, the latter connecting with the fork D, as and for the purposes described.

2. The spring K, secured at the base and connecting with arms C, as and for the purposes described.

In testimony that we claim the foregoing as our own we affix our signatures in presence of two witnesses.

PETER F. FLEMING.
   ELI WAYLAND.
   SAMUEL B. GILLILAND.

Witnesses:
 F. B. THOMAS,
 JAS. R. PHELPS.